United States Patent
Fisher (10) Patent No.: US 10,260,563 B2
(45) Date of Patent: Apr. 16, 2019

(54) BEARING CAGES FOR ROLLER BEARING ASSEMBLIES

(71) Applicant: General Electric Company, Schenectady, NY (US)

(72) Inventor: Kenneth Lee Fisher, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/598,756

(22) Filed: May 18, 2017

(65) Prior Publication Data
US 2018/0335087 A1    Nov. 22, 2018

(51) Int. Cl.
*F16C 33/66* (2006.01)
*F16C 19/26* (2006.01)
(Continued)

(52) U.S. Cl.
CPC .......... *F16C 33/6681* (2013.01); *F16C 19/26* (2013.01); *F16C 33/4629* (2013.01); *F16C 33/6677* (2013.01); *F01D 25/16* (2013.01); *F05D 2220/32* (2013.01); *F05D 2240/54* (2013.01); *F05D 2260/98* (2013.01); *F16C 2360/23* (2013.01)

(58) Field of Classification Search
CPC .................................................. F16C 33/6681
See application file for complete search history.

(56) References Cited

U.S. PATENT DOCUMENTS 4,222,620 A * 9/1980 Mirring ............... F16C 33/4635
                                                   384/576
4,345,799 A * 8/1982 Crofts ................. F16C 33/3843
                                                   384/470
(Continued)

FOREIGN PATENT DOCUMENTS

EP          2803436 A2    11/2014
JP       2008002659 A      1/2008
WO      2014143876 A1      9/2014

OTHER PUBLICATIONS

Shoda et al., "The Performance of a Hybrid Ceramic Ball Bearing Under High Speed Conditions with the Under-Race Lubrication Method", Tribology Transactions, vol. 40, Issue: 4, pp. 676-684, 1997.

*Primary Examiner* — Thomas R Hannon
(74) *Attorney, Agent, or Firm* — Peter A. Flynn (57) ABSTRACT

A bearing cage for a roller bearing assembly is provided. The roller bearing assembly includes an outer annular ring, an inner annular ring including an outer radial surface, and a plurality of roller elements. The bearing cage includes an annular body configured to be positioned between the inner annular ring and the outer annular ring and configured to receive the plurality of roller elements. The annular body includes a first end including a first inner radial surface opposite the inner annular ring and a second end including a second inner radial surface opposite the inner annular ring, wherein the annular body extends from the first end to the second end in an axial direction. The annular body includes a first lubricant interface configured to receive oil and defined by the first inner radial surface and a second lubricant interface configured to receive oil and defined by the second inner radial surface.

8 Claims, 5 Drawing Sheets

(51) Int. Cl.
*F16C 33/46* (2006.01)
*F01D 25/16* (2006.01)

(56) References Cited

U.S. PATENT DOCUMENTS

| | | | |
|---|---|---|---|
| 4,384,749 A | | 5/1983 | Schaefer |
| 4,425,011 A | * | 1/1984 | Cunningham ........ F16C 19/364 384/571 |
| 4,934,841 A | * | 6/1990 | De Vito .............. F16C 33/4635 384/572 |
| 5,106,209 A | * | 4/1992 | Atkinson ................ F16C 33/60 384/462 |
| 5,399,027 A | * | 3/1995 | Ijuin ................... F16C 33/6677 384/448 |
| 6,409,464 B1 | | 6/2002 | Fisher et al. |
| 7,832,943 B2 | * | 11/2010 | Hashimoto ........... F16C 19/466 384/548 |
| 8,123,413 B2 | | 2/2012 | Tambe et al. |
| 8,172,717 B2 | | 5/2012 | Lopez et al. |
| 8,198,744 B2 | | 6/2012 | Kern et al. |
| 8,235,861 B2 | | 8/2012 | Lopez et al. |
| 8,287,423 B2 | | 10/2012 | Lopez et al. |
| 8,292,511 B2 | * | 10/2012 | Gibbons ............. F16C 33/6651 384/462 |
| 8,298,114 B2 | | 10/2012 | Lopez et al. |
| 8,459,872 B2 | | 6/2013 | Nies et al. |
| 8,491,435 B2 | | 7/2013 | Ghanime et al. |
| 8,506,446 B2 | | 8/2013 | Minadeo et al. |
| 8,517,612 B2 | | 8/2013 | Metzger et al. |
| 8,517,672 B2 | | 8/2013 | McCooey |
| 8,550,955 B2 | | 10/2013 | Erno et al. |
| 8,550,957 B2 | | 10/2013 | Erno et al. |
| 8,616,777 B1 | | 12/2013 | Smith et al. |
| 8,657,714 B1 | | 2/2014 | Ghanime et al. |
| 8,696,314 B2 | | 4/2014 | Mashue et al. |
| 8,727,629 B2 | | 5/2014 | Do et al. |
| 8,777,802 B2 | | 7/2014 | Erno et al. |
| 8,857,192 B2 | | 10/2014 | Huang et al. |
| 8,904,746 B2 | | 12/2014 | Fang et al. |
| 2006/0062504 A1 | | 3/2006 | Wilton et al. |
| 2006/0193545 A1 | * | 8/2006 | Bridges ............... F16C 33/3843 384/470 |
| 2007/0248295 A1 | * | 10/2007 | Kerr ................... F16C 33/3843 384/470 |
| 2010/0086247 A1 | | 4/2010 | Walker |
| 2016/0108963 A1 | * | 4/2016 | Sebald ............... F16C 33/6681 384/470 |
| 2017/0370411 A1 | * | 12/2017 | Kamamoto ........ F16C 33/4676 |

\* cited by examiner

BEARING CAGES FOR ROLLER BEARING ASSEMBLIES

BACKGROUND

The field of the disclosure relates generally to a bearing and, more specifically, to bearing cages for roller bearing assemblies.

At least some known machines include one or more shafts which are rotatably supported by several known bearings, typically of a rolling-element type. These known bearings in the machine are usually a combination of roller bearings and ball bearings and are enclosed in sumps, which are pressurized and receive an oil flow for lubrication and cooling. The roller bearings support radial loads induced by the shafts, and the ball bearings support radial and thrust loads induced by the shafts.

Some known roller bearing assemblies include an inner annular ring coupled to the shaft and an outer annular ring, with a plurality of rollers circumferentially spaced about a center axis therebetween. The roller bearing assembly further includes a bearing cage that is positioned between the inner and outer annular rings to receive the rollers. These roller bearing assemblies may also be used in a planetary bearing assembly. At least some planetary bearing assemblies include from three to six roller bearing assemblies circumferentially spaced about a planetary center axis. Each roller bearing assembly is rotatable about its center axis, and the entire planetary bearing assembly is rotatable about its planetary center axis. With multiple axes of rotation, centrifugal forces on each roller bearing assembly are increased. As such, the bearing cage has increased contact with the inner ring, thereby accelerating wear within the roller bearing assembly.

BRIEF DESCRIPTION

In one aspect, a bearing cage for a roller bearing assembly is provided. The roller bearing assembly includes an outer annular ring, an inner annular ring including an outer radial surface, and a plurality of roller elements. The bearing cage includes an annular body configured to be positioned between the inner annular ring and the outer annular ring and configured to receive the plurality of roller elements. The annular body includes a first end including a first inner radial surface opposite the inner annular ring and a second end including a second inner radial surface opposite the inner annular ring, wherein the annular body extends from the first end to the second end in an axial direction. The annular body includes a first lubricant interface configured to receive oil and defined by the first inner radial surface and a second lubricant interface configured to receive oil and defined by the second inner radial surface.

In another aspect, a roller bearing assembly is provided. The roller bearing assembly includes an inner annular ring including an outer radial surface, an outer annular ring, a plurality of roller elements, and a bearing cage. The bearing cage includes an annular body positioned between the inner annular ring and the outer annular ring and housing the plurality of roller elements. The annular body includes a first end including a first inner radial surface opposite the inner annular ring and a second end including a second inner radial surface opposite the inner annular ring, wherein the annular body extends from the first end to the second end in an axial direction. The annular body also includes a first lubricant interface configured to receive oil and defined by the first inner radial surface and a second lubricant interface configured to receive oil and defined by the second inner radial surface.

In yet another aspect, a machine is provided. The machine includes at least one rotatable shaft and at least one roller bearing assembly coupled to the at least one rotatable shaft. The at least one roller bearing assembly includes an inner annular ring including an outer radial surface, an outer annular ring, a plurality of roller elements, and a bearing cage. The bearing cage includes an annular body positioned between the inner annular ring and the outer annular ring and housing the plurality of roller elements. The annular body includes a first end including a first inner radial surface opposite the inner annular ring and a second end including a second inner radial surface opposite the inner annular ring, wherein the annular body extends from the first end to the second end in an axial direction. The annular body also includes a first lubricant interface configured to receive oil and defined by the first inner radial surface and a second lubricant interface configured to receive oil and defined by the second inner radial surface.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations extending substantially parallel to a longitudinal axis of a roller bearing assembly. Moreover, the terms "radial" and "radially" refer to directions and orientations extending substantially perpendicular to the longitudinal axis of the roller bearing assembly. In addition, as used herein, the terms "circumferential" and "circumferentially" refer to directions and orientations extending arcuately about a longitudinal axis of the roller bearing assembly.

Embodiments of the present disclosure relate to bearing assemblies that facilitate reducing wear of the components therein. Specifically, in the exemplary embodiment, a bearing cage includes a first axial end and a second axial end that extend along an inner ring to form a first lubricant interface and a second lubricant interface. As such, a bearing surface area is formed between the bearing cage and the inner ring that defines a thin annular film space. Oil received in the annular film space forms a protective oil film to absorb loading therein. In some embodiments, a cross-rail groove defined in each cross-rail extending between the first axial end and the second axial end facilitates channeling oil to at least one of the annular film spaces formed by the first lubricant interface and the second lubricant interface such that the oil film is formed in each of the first lubricant interface and the second lubricant interface. In yet other embodiments, a radial opening defined within the inner ring facilitates channeling oil to the annular film space such that the oil film is formed. By forming an effective film space and providing a consistent flow of oil thereto, the embodiments of the bearing assemblies described herein reduce wear of the bearing cage and the inner ring.

Figure 1:
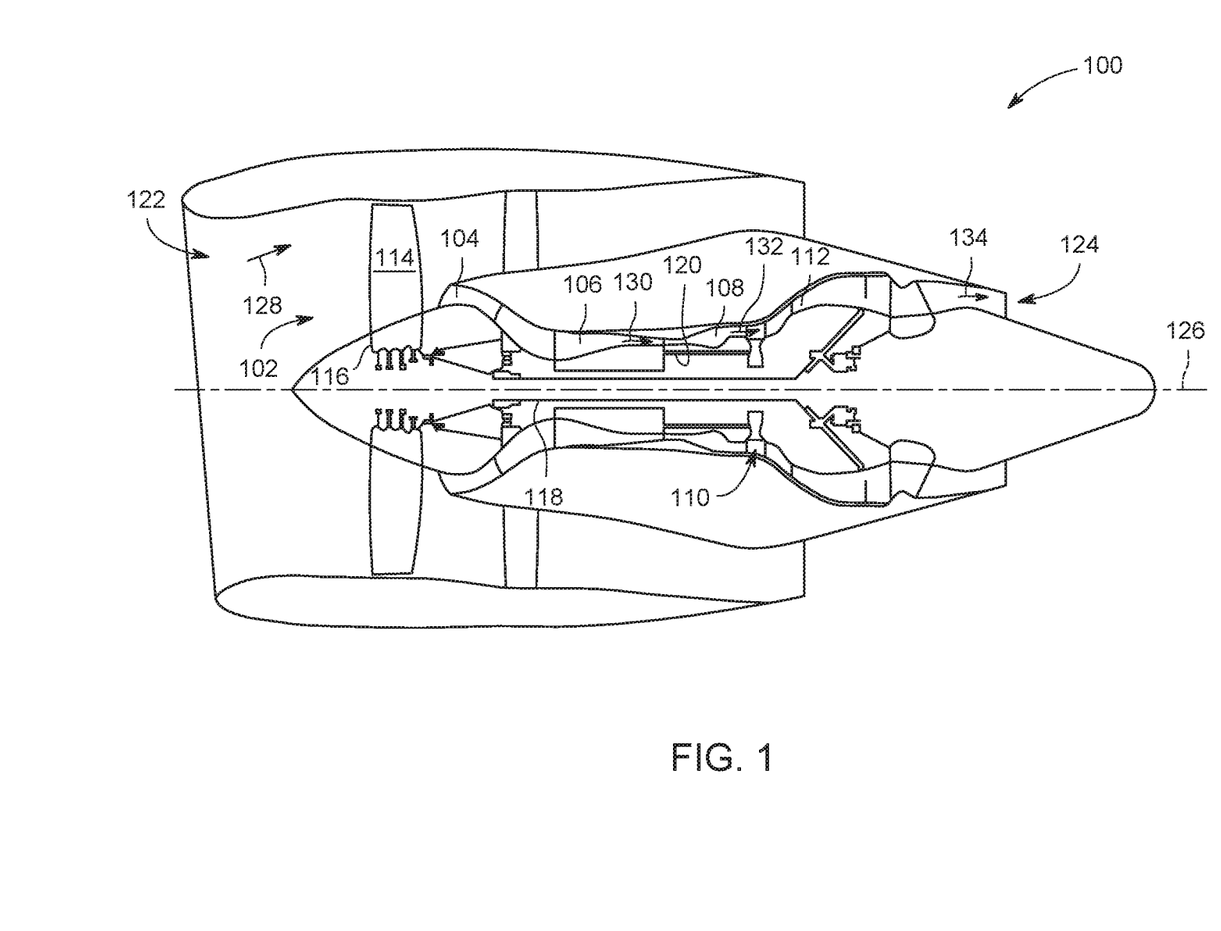
FIG. 1 is a schematic view of an exemplary machine, i.e., a gas turbine engine.

FIG. 1 is a schematic view of a machine 100, i.e., a turbomachine, and more specifically, a turbine engine. In the exemplary embodiment, turbine engine 100 is a gas turbine engine. Alternatively, turbine engine 100 is any other turbine engine and/or machine, including, and without limitation, a steam turbine engine, an aircraft engine, a wind turbine, a compressor, and a pump. In the exemplary embodiment, gas turbine engine 100 includes a fan assembly 102, a low pressure or booster compressor 104, a high-pressure compressor 106, and a combustor 108. Fan assembly 102, booster compressor 104, high-pressure compressor 106, and combustor 108 are coupled in flow communication. Turbine engine 100 also includes a high-pressure turbine 110 coupled in flow communication with combustor 108 and a low-pressure turbine 112. Fan assembly 102 includes an array of fan blades 114 extending radially outward from a rotor disk 116. Low-pressure turbine 112 is coupled to fan assembly 102 and booster compressor 104 via a first drive shaft 118, and high-pressure turbine 110 is coupled to high-pressure compressor 106 via a second drive shaft 120. Turbine engine 100 has an intake 122 and an exhaust 124. Turbine engine 100 further includes a centerline 126 about which fan assembly 102, booster compressor 104, high-pressure compressor 106, and turbine assemblies 110 and 112 rotate.

In operation, intake 122 channels air 128 through fan assembly 102, as well as booster compressor 104 and high-pressure compressor 106. Compressors 104 and 106 compress inlet air 128 to higher pressures prior to discharging compressed air 130 towards combustor 108. Compressed air 130 is channeled to combustor 108 where it is mixed with fuel (not shown) and burned to generate high temperature combustion gases 132. Combustion gases 132 are channeled downstream towards high-pressure turbine 110 and low-pressure turbine 112, such that after impinging turbine blades (not shown) thermal energy is converted to mechanical rotational energy that is used to drive first drive shaft 118 and second drive shaft 120 respectively about centerline 126. Exhaust gases 134 then discharge through exhaust 124 to ambient atmosphere.

Figure 2:
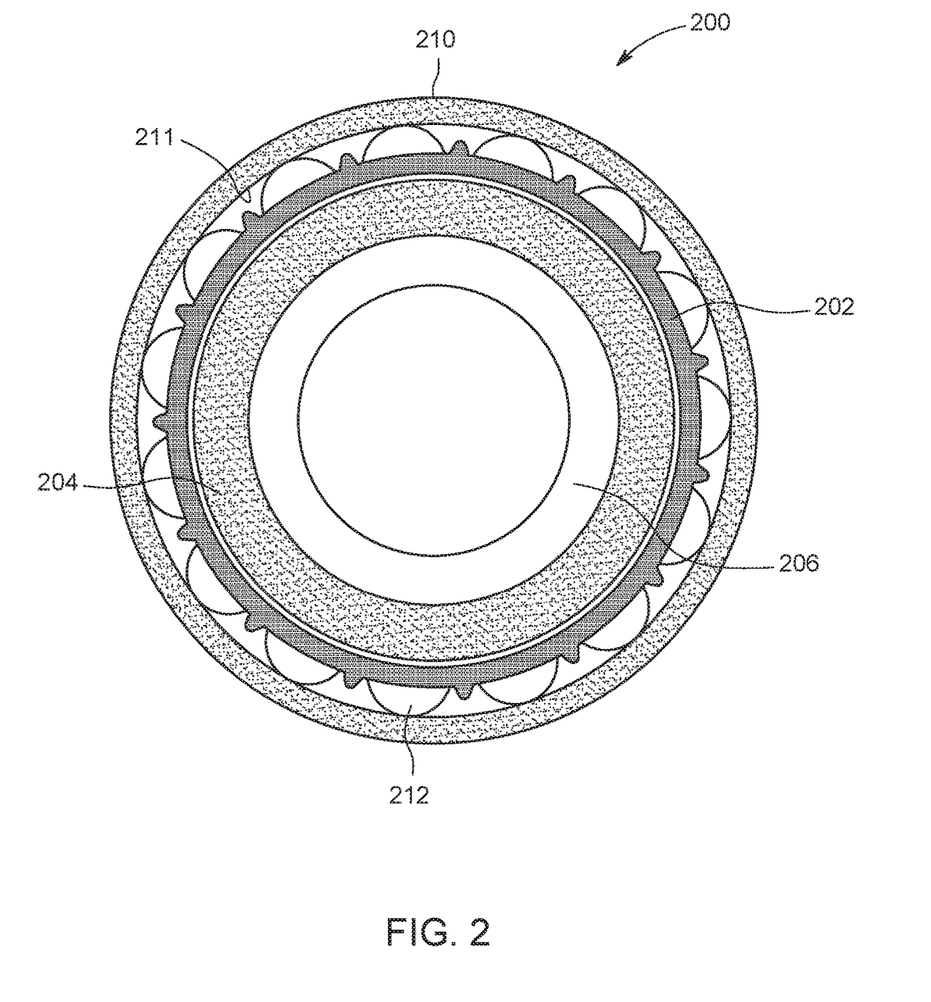
FIG. 2 is a schematic end view of an exemplary bearing assembly that may be used with the machine shown in FIG. 1.
Figure 3:
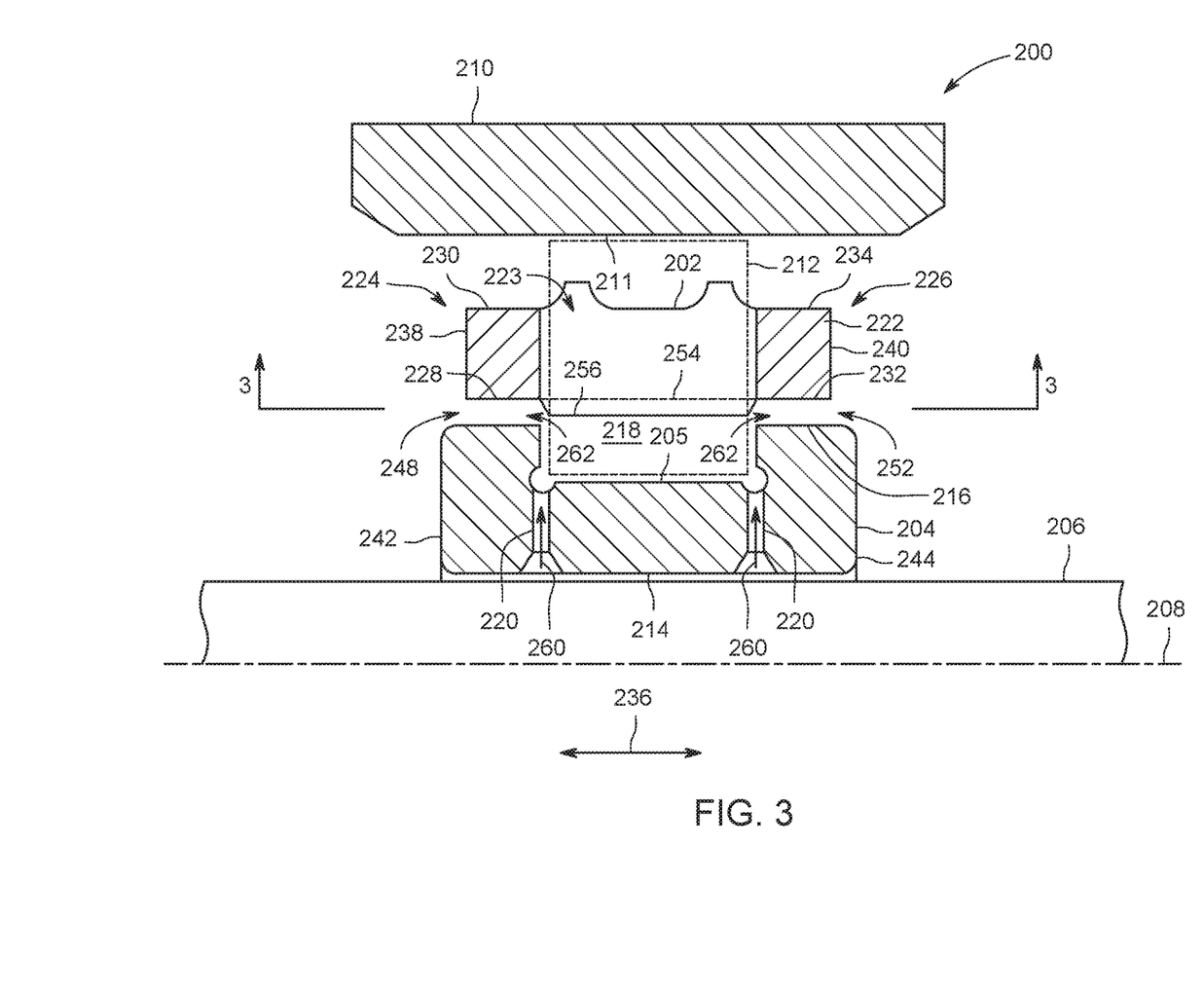
FIG. 3 is a cross-sectional view of the bearing assembly shown in FIG. 2.
Figure 4:
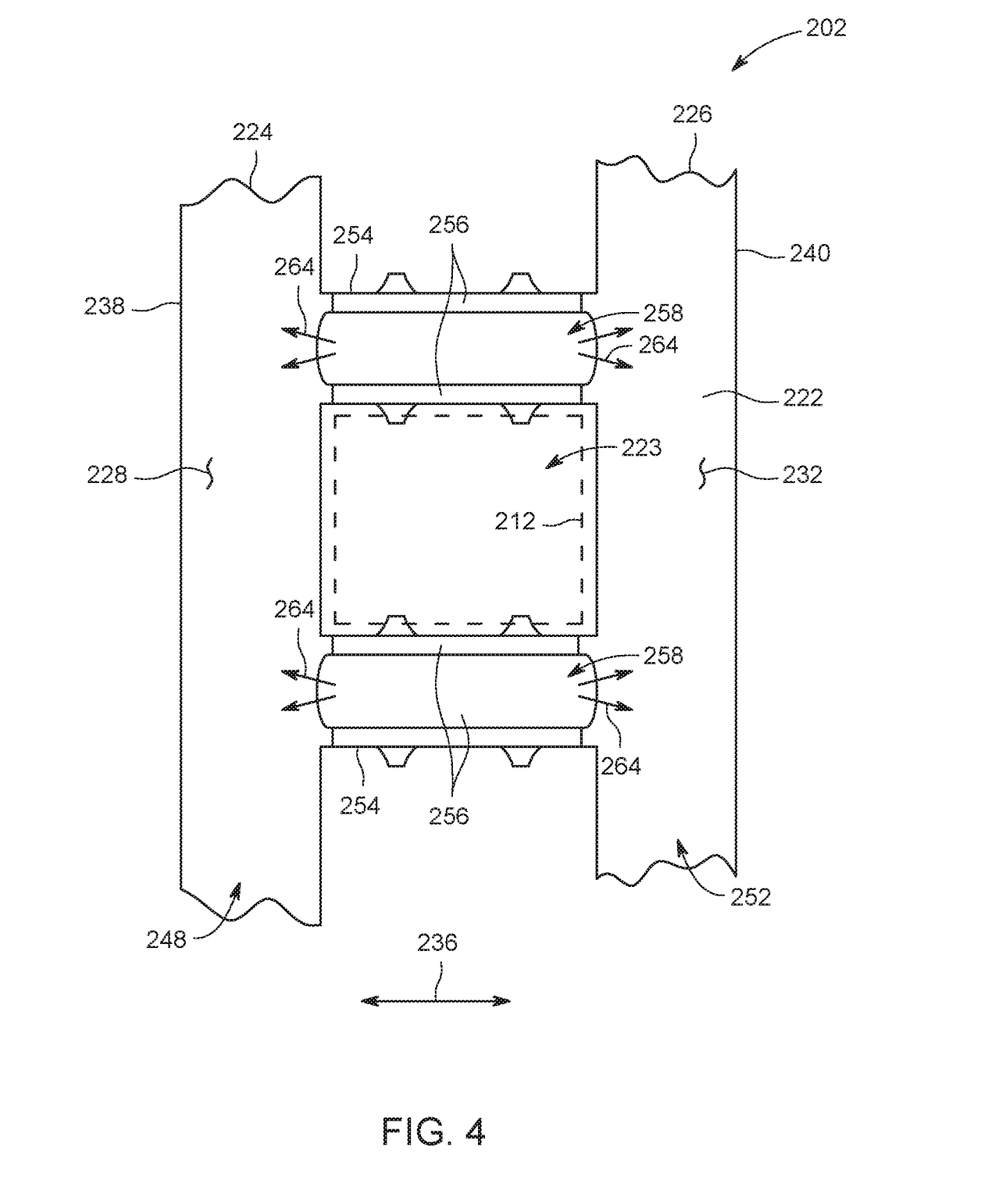
FIG. 4 is a plan view of an exemplary bearing cage taken along line 3-3 as shown in FIG. 3.

FIG. 2 is a schematic end view of an exemplary bearing assembly 200 that may be used with machine 100 (shown in FIG. 1). FIG. 3 is a cross-sectional view of bearing assembly 200 (shown in FIG. 2). FIG. 4 is a plan view of an exemplary bearing cage 202 taken along line 3-3 as shown in FIG. 3. Referring to FIGS. 2-4, in the exemplary embodiment, bearing assembly 200 includes an inner annular ring 204 including an inner race 205 mounted on a shaft 206 that is rotatable about a centerline 208. Bearing assembly 200 also includes an outer annular ring 210 including an outer race 211 that surrounds inner annular ring 204. Positioned between inner annular ring 204 and outer annular ring 210 are a plurality of circumferentially spaced cylindrical roller elements 212.

Inner annular ring 204 includes an inner radial surface 214 and an opposite outer radial surface 216. Outer radial surface 216 includes an outer radial cavity 218 defined therein, and along with inner race 205, facilitates receiving at least a portion of roller element 212. At least one first radial opening 220 is defined through inner annular ring 204 from inner radial surface 214 to outer radial cavity 218. First radial opening 220 facilitates channeling a lubricant, such as oil, into outer radial cavity 218.

Bearing cage 202 includes an annular body 222 extending in axial direction 236, configured to be positioned between inner annular ring 204 and outer annular ring 210, and configured to receive a plurality of roller elements 212. Annular body 222 includes a plurality of roller cavities 223 defined therein that facilitate receiving plurality of roller elements 212 and maintaining a position of each roller element 212 relative to one another. Annular body 222 includes a first end 224 and an opposite second end 226. First end 224 includes a first inner radial surface 228 opposite inner ring outer radial surface 216 and a radially outer surface 230 opposite outer annular ring 210. Similarly, second end 226 includes a second inner radial surface 232 opposite inner ring outer radial surface 216 and a radially outer surface 234 opposite outer annular ring 210. In the exemplary embodiment, inner radial surfaces 228 and 232 have a similar diameter about centerline 208. First end 224 and second end 226 define axial direction 236. Along axial direction 236, first end 224 includes a first sidewall 238 and second end 226 includes a second sidewall 240. In the exemplary embodiment, a first axial sidewall 242 of inner annular ring 204 axially extends beyond first sidewall 238. Similarly, a second axial sidewall 244 of inner annular ring 204 axially extends beyond second sidewall 240.

In the exemplary embodiment, bearing cage 202 further includes a first lubricant interface 248 defined at first end 224 between inner radial surface 228 and inner ring outer radial surface 216 that facilitates receiving oil therethrough. Similarly, bearing cage 202 further includes a second lubricant interface 252 defined at second end 226 between inner radial surface 232 and inner ring outer radial surface 216 that facilitates receiving oil therethrough. Additionally, bearing cage 202 includes a plurality of circumferentially spaced cross-rails 254 that extend between first end 224 and second end 226. Cross-rail 254 includes an inner radial surface 256 that has a groove 258 defined therein. Each groove 258 is in fluid communication with both of first lubricant interface 248 and second lubricant interface 252, and as such, each groove 258 facilitates receiving oil and channeling the oil to first lubricant interface 248 and second lubricant interface 252. In the exemplary embodiment, cross-rail inner radial surface 256 has a diameter about centerline 208 that is less than the diameter of body inner radial surfaces 228 and 232. Plurality of cross-rails 254 are configured to receive oil flow 262 from inner annular ring 204 and plurality of roller elements 212.

In operation, bearing assembly 200 facilitates supporting radial loads induced by shaft 206, and a lubricant, such as oil, is typically provided within bearing assembly 200 to reduce wear metal-to-metal contact of the components. For example, oil 260 is channeled through one or more radial openings 220 into inner ring outer radial cavity 218 to cool and lubricate roller element 212 therein. In a planetary bearing, with multiple axes of rotation, centrifugal forces increase contact between bearing cage 202 and inner annular ring 204, and thus accelerate wear. To reduce wear thereof, first lubricant interface 248 and second lubricant interface 252 define a thin annular oil film space that facilities forming a film of oil between bearing cage 202 and inner annular ring 204. A portion 262 of oil from roller element 212 is routed through first lubricant interface 248 and second lubricant interface 252 to facilitate forming the protective oil film.

In the exemplary embodiment, each cross-rail groove 258 is configured to channel oil flow 264 to first lubricant interface 248 and second lubricant interface 252 to further facilitate oil flow therethrough and the formation of oil film within first lubricant interface 248 and second lubricant interface 252.

Figure 5:
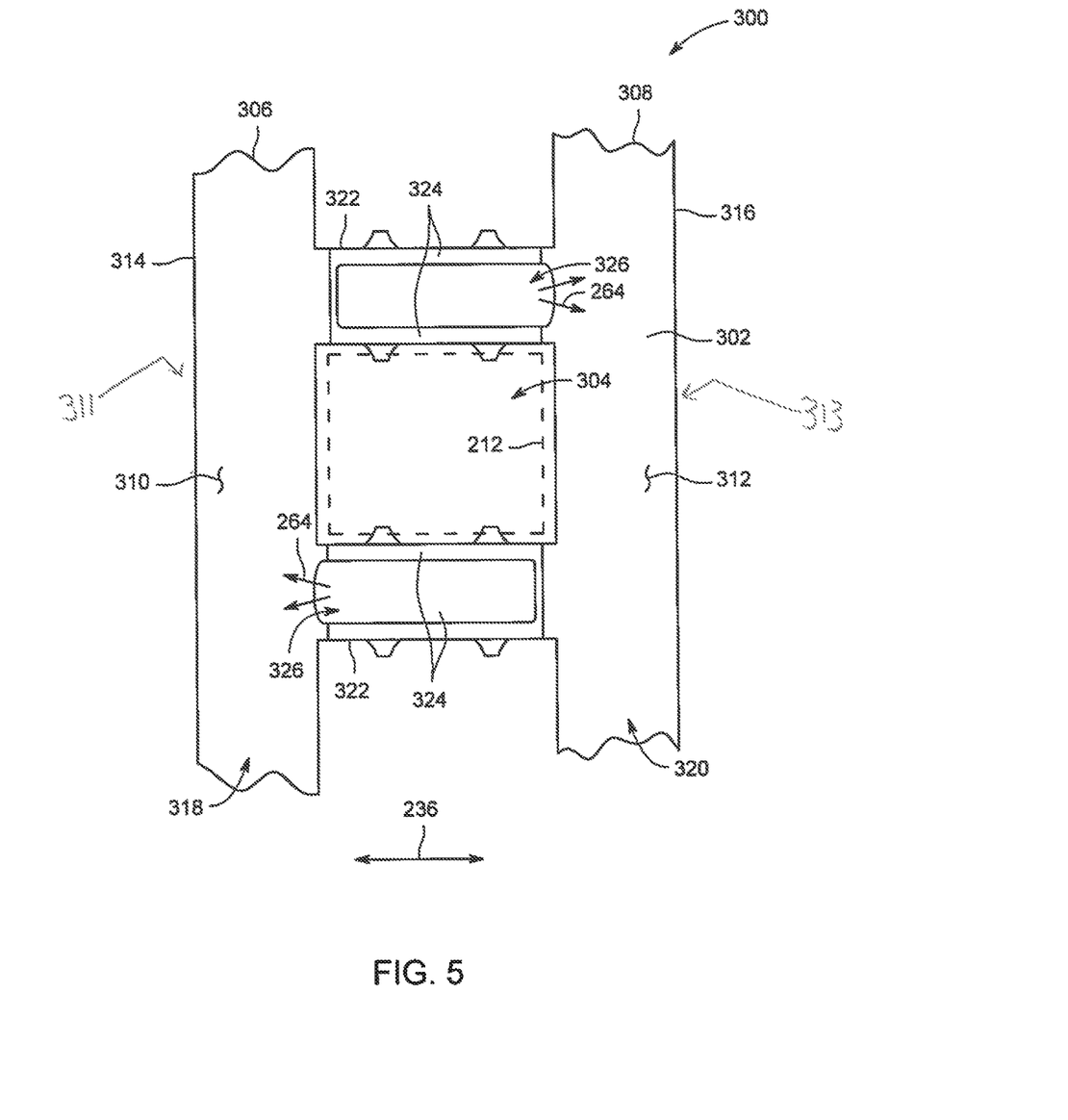
FIG. 5 is a plan view of another exemplary bearing cage taken along line 3-3 as shown in FIG. 3.

FIG. 5 is a plan view of another exemplary bearing cage 300 taken along line 3-3 as shown in FIG. 3. Referring to FIGS. 2, 3, and 5, in this embodiment, bearing assembly 200 includes an inner annular ring 204 including an inner race 205 mounted on a shaft 206 that is rotatable about a centerline 208. Bearing assembly 200 also includes an outer annular ring 210 including an outer race 211 that surrounds inner annular ring 204. Positioned between inner annular ring 204 and outer annular ring 210 are a plurality of circumferentially spaced cylindrical roller elements 212.

Bearing cage 300 includes an annular body 302 extending in axial direction 236, configured to be positioned between inner annular ring 204 and outer annular ring 210, and configured to receive a plurality of roller elements 212. Annular body 302 includes a plurality of roller cavities 304 defined therein that facilitate receiving plurality of roller elements 212 and maintaining a position of each roller element 212 relative to one another. Annular body 302 includes a first end 306 and an opposite second end 308. First end 306 includes a first inner radial surface 310 opposite inner ring outer radial surface 216 and a first radially outer surface 311 (not shown) opposite outer annular ring 210. Similarly, second end 308 includes a second inner radial surface 312 opposite inner ring outer radial surface 216 and a second radially outer surface 313 opposite outer annular ring 210. In the exemplary embodiment, inner radial surfaces 310 and 312 have a similar diameter about centerline 208. First end 306 and second end 308 define axial direction 236. Along axial direction 236, first end 306 includes a first sidewall 314 and second end 308 includes a second sidewall 316. In the exemplary embodiment, a first axial sidewall 242 of inner annular ring 204 axially extends beyond first sidewall 314. Similarly, a second axial sidewall 244 of inner annular ring 204 axially extends beyond second sidewall 316.

In the exemplary embodiment, bearing cage 300 further includes a first lubricant interface 318 defined at first end 306 between first inner radial surface 310 and inner ring outer radial surface 216 that facilitates receiving oil therethrough. Similarly, bearing cage 300 further includes a second lubricant interface 320 defined at second end 308 between second inner radial surface 312 and inner ring outer radial surface 216 that facilitates receiving oil therethrough. Additionally, bearing cage 300 includes a plurality of circumferentially spaced cross-rails 322 that extend between first end 306 and second end 308. Cross-rail 322 includes an inner radial surface 324 that has an axial groove 326 defined therein. In the exemplary embodiment, a first portion of plurality of axial grooves 326 is in fluid communication with first lubricant interface 318 and each axial groove 326 of the first portion is configured to facilitate channeling oil flow 264 to first lubricant interface 318. A second portion of plurality of axial grooves 326 is in fluid communication with second lubricant interface 320 and each axial groove 326 of the second portion is configured to facilitate channeling oil flow 264 to second lubricant interface 320. In the exemplary embodiment, cross-rail inner radial surface 324 has a diameter about centerline 208 that is less than the diameter of body inner radial surfaces 310 and 312. Plurality of cross-rails 322 are configured to receive oil flow 262 from inner annular ring 204 and plurality of roller elements 212. In alternative embodiments, cross-rail inner radial surface 324 has a diameter that is substantially equal to or greater than the diameter of body inner radial surfaces 310 and 312.

The above-described embodiments provide efficient bearing assemblies for reducing wear of the components therein. Specifically, in the exemplary embodiment, a bearing cage includes a first axial end and a second axial end that extend along an inner ring to form a first lubricant interface and a second lubricant interface. As such, a bearing surface area is formed between the bearing cage and the inner ring that defines a thin annular film space. Oil received in the annular film space forms a protective oil film to absorb loading therein. In some embodiments, a cross-rail groove defined in each cross-rail extending between the first axial end and the second end facilitates channeling oil to at least one of the annular film spaces formed by the first lubricant interface and the second lubricant interface such that the oil film is formed in each of the first lubricant interface and the second lubricant interface. In yet other embodiments, a radial opening defined within the inner ring facilitates channeling oil to the annular film space such that the oil film is formed. By forming an effective film space and providing a consistent flow of oil thereto, the embodiments of the bearing assemblies described herein reduce wear of the bearing cage and the inner ring.

An exemplary technical effect of the systems and methods described herein includes at least one of: (a) forming an effective bearing area with an oil film to reduce wear within a bearing assembly; (b) continuously channeling a flow of oil to form the oil film; (c) reducing wear between a bearing cage and an inner ring in the bearing assembly; and (d) increasing bearing assembly efficiency.

Exemplary embodiments of systems and methods for reducing wear in a bearing assembly are described above in detail. The methods and systems are not limited to the specific embodiments described herein, but rather, components of systems and/or steps of the methods may be utilized independently and separately from other components and/or steps described herein. For example, the method may also be used in combination with other machine components, and are not limited to practice only with the roller bearing assemblies as described herein. Rather, the exemplary embodiment can be implemented and utilized in connection with many other machine applications.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A roller bearing assembly comprising:
   an inner annular ring comprising an outer radial surface;
   an outer annular ring, said outer annular ring surrounding said inner annular ring;
   a plurality of roller elements; and
   a bearing cage comprising:
      an annular body positioned between said inner annular ring and said outer annular ring and housing said plurality of roller elements, said annular body comprising:
         a first end comprising a first inner radial surface opposite the inner annular ring;
         a second end comprising a second inner radial surface opposite the inner annular ring, wherein said annular body extends from said first end to said second end in an axial direction;
         a first lubricant interface configured to receive oil, said first lubricant interface defined by said first inner radial surface; and
         a second lubricant interface configured to receive oil, said second lubricant interface defined by said second inner radial surface,
      wherein said annular body further comprises a plurality of cross-rails extending axially between said first end and said second end, said plurality of cross-rails each comprising a third inner radial surface opposite the inner annular ring, said plurality of third inner radial surfaces defining a plurality of axial grooves configured to receive and channel oil to at least one of said first lubricant interface and said second lubricant interface, and
      wherein each of said plurality of axial grooves is configured to channel the oil to only one of said first lubricant interface and said second lubricant interface.

2. The roller bearing assembly in accordance with claim 1, the outer annular ring further comprising:
   an outer race, the outer race surrounding the inner annular ring,
   wherein said inner annular ring defines at least one radial opening extending through said inner annular ring towards at least one of said first lubricant interface and said second lubricant interface, and wherein said at least one radial opening is configured to channel oil towards at least one of said first lubricant interface and said second lubricant interface.

3. The roller bearing assembly in accordance with Claim 2, wherein said plurality of cross-rails are configured to receive oil from said at least one radial opening and said plurality of roller elements.

4. The roller bearing assembly in accordance with claim 2, wherein said first inner radial surface and said second inner radial surface have a first diameter relative to a longitudinal axis of the roller bearing assembly, wherein said third radial surface has a second diameter relative to the longitudinal axis, and wherein the first diameter is greater than the second diameter.

5. The roller bearing assembly in accordance with claim 2, wherein a first portion of said plurality of axial grooves is configured to channel oil to said first lubricant interface, and wherein a second portion of said plurality of axial grooves is in fluid communication with said second lubricant interface, and
   wherein said second portion of said plurality of axial grooves is configured to channel oil to said second lubricant interface.

6. A machine comprising:
   at least one rotatable shaft; and
   at least one roller bearing assembly coupled to said at least one rotatable shaft, said at least one roller bearing assembly comprising:
      an inner annular ring including an outer radial surface;
      an outer annular ring;
      a plurality of roller elements; and
      a bearing cage comprising:
         an annular body positioned between said inner annular ring and said outer annular ring and housing said plurality of roller elements, said annular body comprising:
            a first end comprising a first inner radial surface opposite the inner annular ring;
            a second end comprising a second inner radial surface opposite the inner annular ring, wherein said annular body extends from said first end to said second end in an axial direction;
            a first lubricant interface configured to receive oil, said first lubricant interface defined by said first inner radial surface; and
            a second lubricant interface configured to receive oil, said second lubricant interface defined by said second inner radial surface,
         wherein said inner annular ring defines at least one radial opening extending through said inner annular ring towards at least one of said first lubricant interface and said second lubricant interface, and wherein said at least one radial opening is configured to channel oil towards at least one of said first lubricant interface and said second lubricant interface,
         wherein said annular body further comprises a plurality of cross-rails extending axially between said first end and said second end, said plurality of cross-rails comprising a plurality of third radial surfaces opposite the inner annular ring, said plurality of third radial surfaces defining a plurality of axial grooves configured to receive oil and channel the oil to at least one of said first lubricant interface and said second lubricant interface, wherein a first portion of said plurality of axial grooves is configured to channel the oil to said first lubricant interface and a second portion of said plurality of axial grooves is configured to channel the oil to said second lubricant interface, wherein each of said plurality of axial grooves is configured to channel the oil to only one of said first lubricant interface and said second lubricant interface.

7. The machine in accordance with claim 6, wherein said plurality of cross-rails are configured to receive oil from said at least one radial opening and said plurality of roller elements.

8. The machine in accordance with claim 6, wherein said first inner radial surface and said second inner radial surface have a first diameter and said third radial surface has a second diameter, the first diameter greater than the second diameter.

\* \* \* \* \*